US010487610B2

(12) United States Patent
Reyes et al.

(10) Patent No.: US 10,487,610 B2
(45) Date of Patent: Nov. 26, 2019

(54) BLOWOUT PREVENTER MONITORING SYSTEMS AND METHODS

(71) Applicant: Cameron International Corporation, Houston, TX (US)

(72) Inventors: Salvador Reyes, Houston, TX (US); Mark Saunders, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 330 days.

(21) Appl. No.: 15/440,152

(22) Filed: Feb. 23, 2017

(65) Prior Publication Data
US 2018/0238134 A1 Aug. 23, 2018

(51) Int. Cl.
*E21B 34/02* (2006.01)
*E21B 33/06* (2006.01)
*E21B 34/16* (2006.01)
*G01D 5/14* (2006.01)

(52) U.S. Cl.
CPC .............. *E21B 33/06* (2013.01); *E21B 34/02* (2013.01); *E21B 34/16* (2013.01); *G01D 5/145* (2013.01)

(58) Field of Classification Search
CPC ......... E21B 34/02; E21B 33/06; E21B 33/062
See application file for complete search history.

(56) References Cited

U.S. PATENT DOCUMENTS

| | | | | |
|---|---|---|---|---|
| 4,121,504 A | * | 10/1978 | Nowak | F15B 15/283 91/363 R |
| 5,320,325 A | * | 6/1994 | Young | E21B 33/062 251/1.3 |
| 7,025,089 B1 | * | 4/2006 | Marsac | F16K 37/0033 137/554 |
| 2010/0152901 A1 | * | 6/2010 | Judge | E21B 33/062 700/275 |
| 2012/0000646 A1 | * | 1/2012 | Liotta | E21B 33/062 166/85.4 |

* cited by examiner

*Primary Examiner* — Cathleen R Hutchins
(74) *Attorney, Agent, or Firm* — Helene Raybaud (57) ABSTRACT

A monitoring system for a blowout preventer (BOP) of a mineral extraction system includes a sensor assembly having a housing, a rotatable wheel supported within the housing, wherein the rotatable wheel extends from the housing to enable linear movement of a movable component of the BOP to drive rotation of the rotatable wheel. The sensor assembly also includes an encoder configured to detect rotation of the rotatable wheel and to generate a signal indicative of the rotation of the rotatable wheel to enable determination of a position of the movable component of the BOP.

20 Claims, 6 Drawing Sheets

BLOWOUT PREVENTER MONITORING SYSTEMS AND METHODS

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A blowout preventer (BOP) stack is installed on a wellhead to seal and control an oil and gas well during drilling operations. A drill string may be suspended inside a drilling riser from a rig through the BOP stack into the well bore. During drilling operations, a drilling fluid is delivered through the drill string and returned up through an annulus between the drill string and a casing that lines the well bore. In the event of a rapid invasion of formation fluid in the annulus, commonly known as a "kick," a movable component within the BOP stack may be actuated to seal the annulus and to control fluid pressure in the wellbore, thereby protecting well equipment disposed above the BOP stack. It would be desirable to monitor a position of the movable component within the BOP stack.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally related to BOP monitoring systems and methods. More particularly, the present embodiments are directed to systems and methods that utilize a monitoring system having a sensor assembly with a rotatable wheel that is configured to contact a movable component of the BOP and to rotate due to the movement (e.g., linear movement) of the movable component of the BOP. The sensor assembly may include an encoder (e.g., hall-effect encoder) that is configured to detect rotation of the rotatable wheel and is configured to generate a signal (e.g., pulses) indicative of the rotation of the rotatable wheel (e.g., transform a mechanical angular position of the rotatable wheel into the signal). A processor may be configured to process the signal to determine a position of the movable component of the BOP (e.g., an open position, a closed position, or a position therebetween) and/or to provide an output indicative of the position of the movable component of the BOP. As discussed in more detail below, the sensor assembly may be placed on an open side of an actuator of the BOP, such as between a wellbore seal (e.g., annular seal) and a chamber seal (e.g., annular seal) within a bonnet of the BOP, for example.

Figure 1:
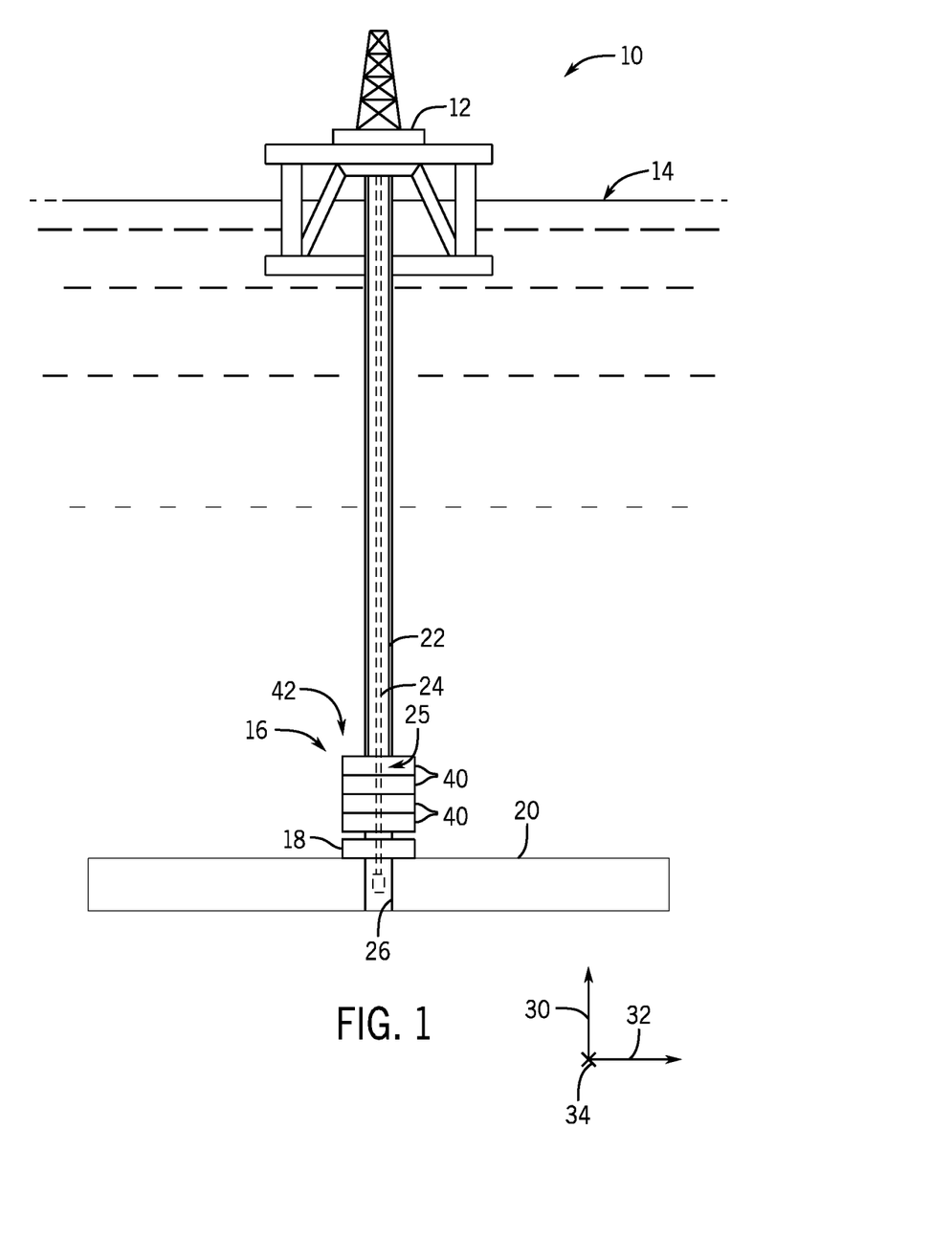
FIG. 1 is a schematic diagram of an offshore system having a monitoring system configured to monitor a position of a movable component of a BOP, in accordance with an embodiment of the present disclosure.

With the foregoing in mind, FIG. 1 is an embodiment of an offshore system 10 (e.g., an offshore mineral extraction system). The offshore system 10 includes an offshore vessel or platform 12 at a sea surface 14. A BOP stack 16 is mounted to a wellhead 18 at a sea floor 20. A tubular drilling riser 22 extends from the platform 12 to the BOP stack 16. The riser 22 may return drilling fluid or mud toward the platform 12 during drilling operations. Downhole operations are carried out by a tubular string 24 (e.g., drill string or production tubing string) that extends from the platform 12, through the riser 22, through a bore 25 of the BOP stack 16, and into a wellbore 26.

To facilitate discussion, the BOP stack 16 and its components may be described with reference to a radial axis or direction 30, an axial axis or direction 32, and a circumferential axis or direction 34. As shown, the BOP stack 16 includes multiple BOPs 40 (e.g., ram BOPs) stacked relative to one another. As discussed in more detail below, each BOP 40 includes a pair of axially opposed rams and corresponding actuators that actuate and drive the rams toward and away from one another along the axial axis 32. Although four BOPs 40 are shown, the BOP stack 16 may include any suitable number of BOPs (e.g., 1, 2, 3, 4, 5, 6, 7, 8, 9, 10 or more). Additionally, the BOP stack 16 may include any of a variety of different types of rams. For example, in certain embodiments, the BOP stack 16 may include one BOP 40 having opposed shear rams or blades configured to sever the tubular string 24 and seal off the wellbore 26 from the riser 22 and one or more BOPs 40 having opposed pipe rams configured to engage the tubular string 24 and to seal the bore 25 (i.e., the annulus around the tubular string 24 disposed within the bore 25). As discussed in more detail below, a monitoring system 42 may be provided to monitor a position (e.g., along the axial axis 32) of a movable component (e.g., an actuator and/or a ram) of the BOP 40.

Figure 2:
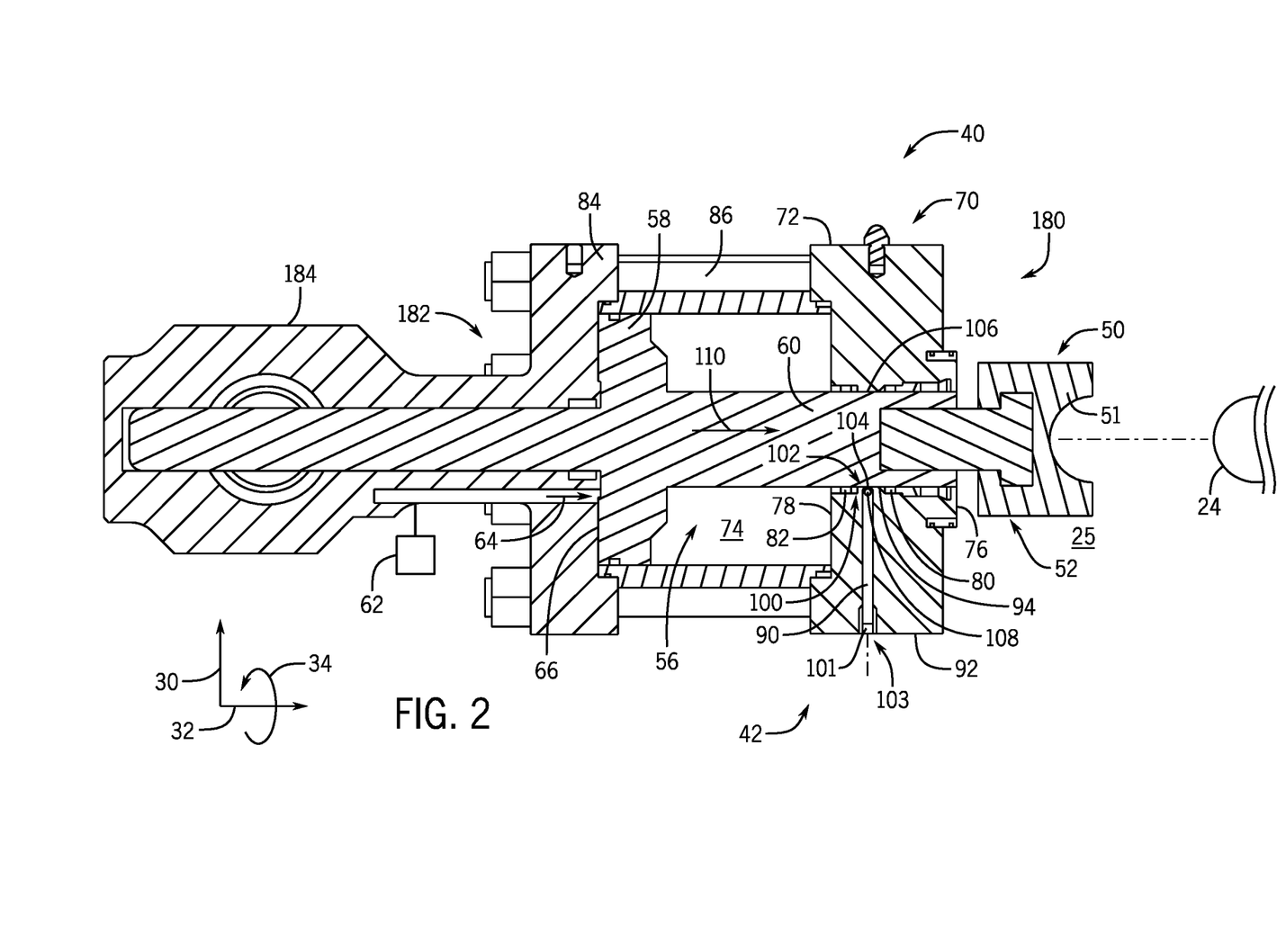
FIG. 2 is a cross-sectional side view of a portion of the BOP of FIG. 1, wherein a ram of the BOP is in an open position.
Figure 3:
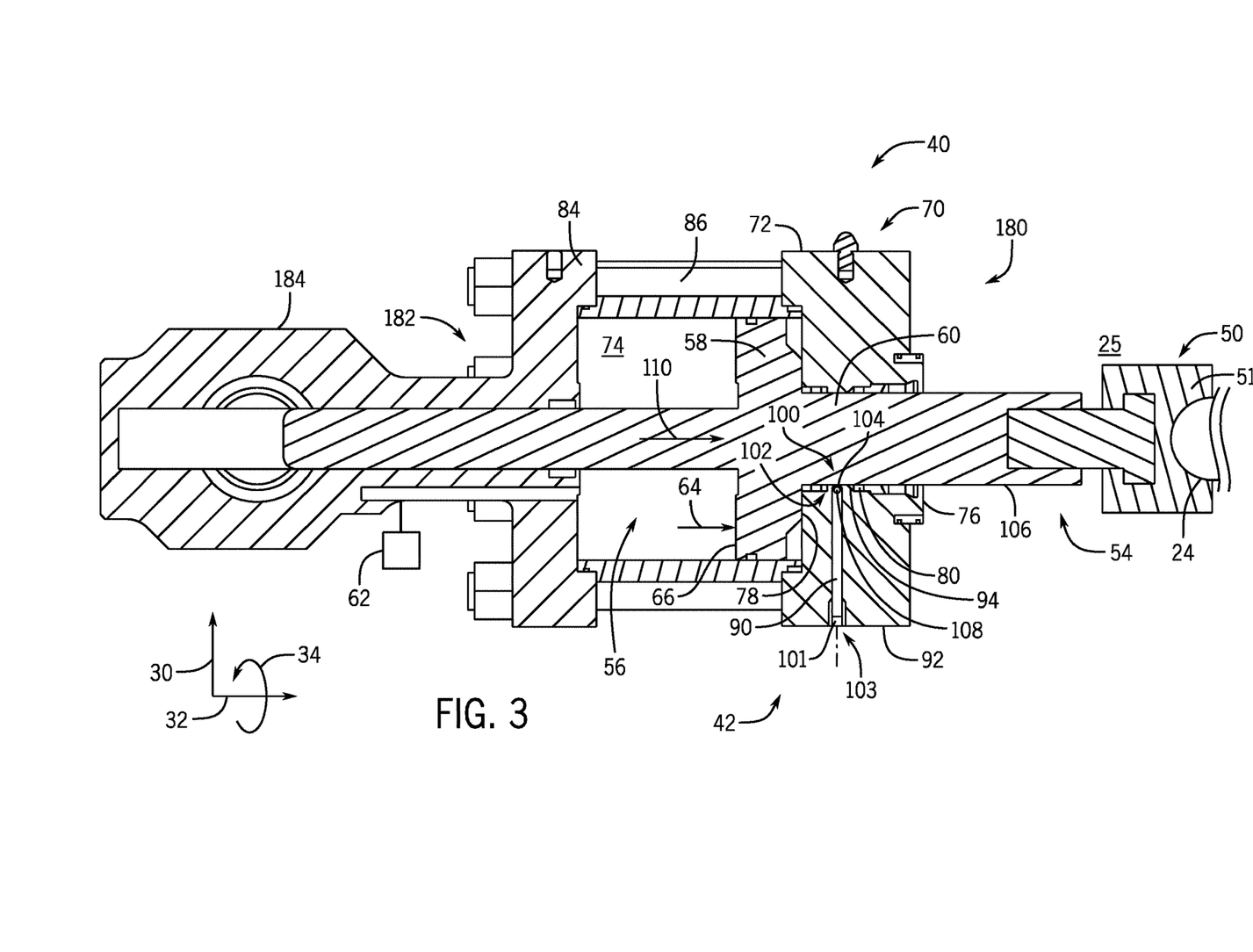
FIG. 3 is a cross-sectional side view of the portion of the BOP of FIG. 2, wherein the ram of the BOP is in a closed position.

FIGS. 2 and 3 are schematic diagrams of the monitoring system 42 and a portion of the BOP 40. In FIG. 2, a ram 50 of the BOP 40 is in an open position 52 (e.g., first position). In the open position 52, each ram 50 is withdrawn from the bore 25, does not contact the tubular string 24 (e.g., a packer 51 of the ram 50 does not contact the tubular string 24), and/or does not contact a corresponding opposed ram 50 (e.g., the packer 51 of the ram 50 does not contact a respective packer 51 of the corresponding opposed ram 50). In FIG. 3, the ram 50 of the BOP 40 is in a closed position 54 (e.g., second position). In the closed position 54, the ram 50 extends into the bore 25, contacts the tubular string 24 (e.g., the packer 51 of the ram 50 contacts the tubular string 24), and/or contacts a corresponding opposed ram 50 (e.g., the packer 51 of the ram 50 contacts a respective packer 51 of the corresponding opposed ram 50).

As shown in FIGS. 2 and 3, an actuator 56 includes a piston 58 and a connecting rod 60, which extends between the piston 58 and the ram 50. In operation, the actuator 56 is configured to actuate and drive (e.g., cause translation of, or cause linear and/or axial movement without rotation) the ram 50 along the axial axis 32 between the open position 52 and the closed position 54. For example, in certain embodiments, a fluid (e.g., gas or liquid) from a fluid source 62 (e.g., accumulator system) may be provided to exert a force 64 on an axially-facing surface 66 of the piston 58 to drive the piston 58, the connecting rod 60, and the attached ram 50 along the axial axis 32, thereby moving the ram 50 from the open position 52 to the closed position 54.

As shown, the BOP 40 includes a body 70 (e.g., housing or support structure), which may surround the actuator 56, the ram 50, and/or the bore 25. In the illustrated embodiment, the body 70 includes a bonnet 72 (e.g., annular bonnet) that circumferentially surrounds the connecting rod 60 of the actuator 56 and is positioned generally between the ram 50 and the piston 58 and/or between the bore 25 and a chamber 74 (e.g., the chamber 74 housing the piston 58 and/or through which the piston 58 moves) along the axial axis 32 of the BOP 40. In some embodiments, the bonnet 72 includes a first axially-facing surface 76 (e.g., annular surface) that is open to the bore 25, that directly contacts the fluid within the bore 25, and/or that is configured to be coupled to a bore housing of the BOP 40 that houses the ram 50 and/or that defines the bore 25, and/or a second axially-facing surface 78 (e.g., annular surface) that is open to the chamber 74 and/or that directly contacts the piston 58 when the ram 50 is in the closed position 54. In some embodiments, the bonnet 72 includes or supports one or more seals (e.g., annular seals), such as a wellbore seal 80 and a chamber seal 82, which are configured to seal against the connecting rod 60, thereby isolating the bore 25 from the chamber 74. As shown, the bonnet 72 is coupled to a flange 84 (e.g., bolted flanged) via one or more fasteners 86 (e.g., threaded fasteners, such as bolts). The flange 84 may support the actuator 56 and/or components (e.g., valves) that are utilized to actuate the actuator 56 and drive the ram 50 between the open position 52 and the closed position 54.

As shown, a channel 90 (e.g., cavity or passageway) is formed within the bonnet 72. In certain embodiments, the channel 90 may extend along the radial axis 30 between a first surface 92 (e.g., outer surface, annular surface, or radially-outer surface) of the bonnet 72 and a second surface 94 (e.g., inner surface, annular surface, or radially-inner surface) of the bonnet 72. As shown, a sensor assembly 100 is positioned at a first end 102 (e.g., radially-inner end) of the channel 90. In some embodiments, a plug 101 (e.g., cap or seal) is positioned at a second end 103 (e.g., radially-outer end) of the channel 90 to isolate the channel 90 from the subsea environment. The sensor assembly 100 may include a rotatable wheel 104 (e.g., rolling member or annular member) that is configured to contact an outer surface 106 (e.g., radially-outer annular surface) of the connecting rod 60. An axis of rotation 108 of the rotatable wheel 104 is generally perpendicular (e.g., transverse) to a direction of travel 110 of the actuator 56. Thus, as the actuator 56 moves in the direction of travel 110 to drive the ram 50 between the open position 52 and the closed position 54, the actuator 56 drives (e.g., via frictional forces) the rotatable wheel 104 to rotate about its axis of rotation 108.

Figure 4:
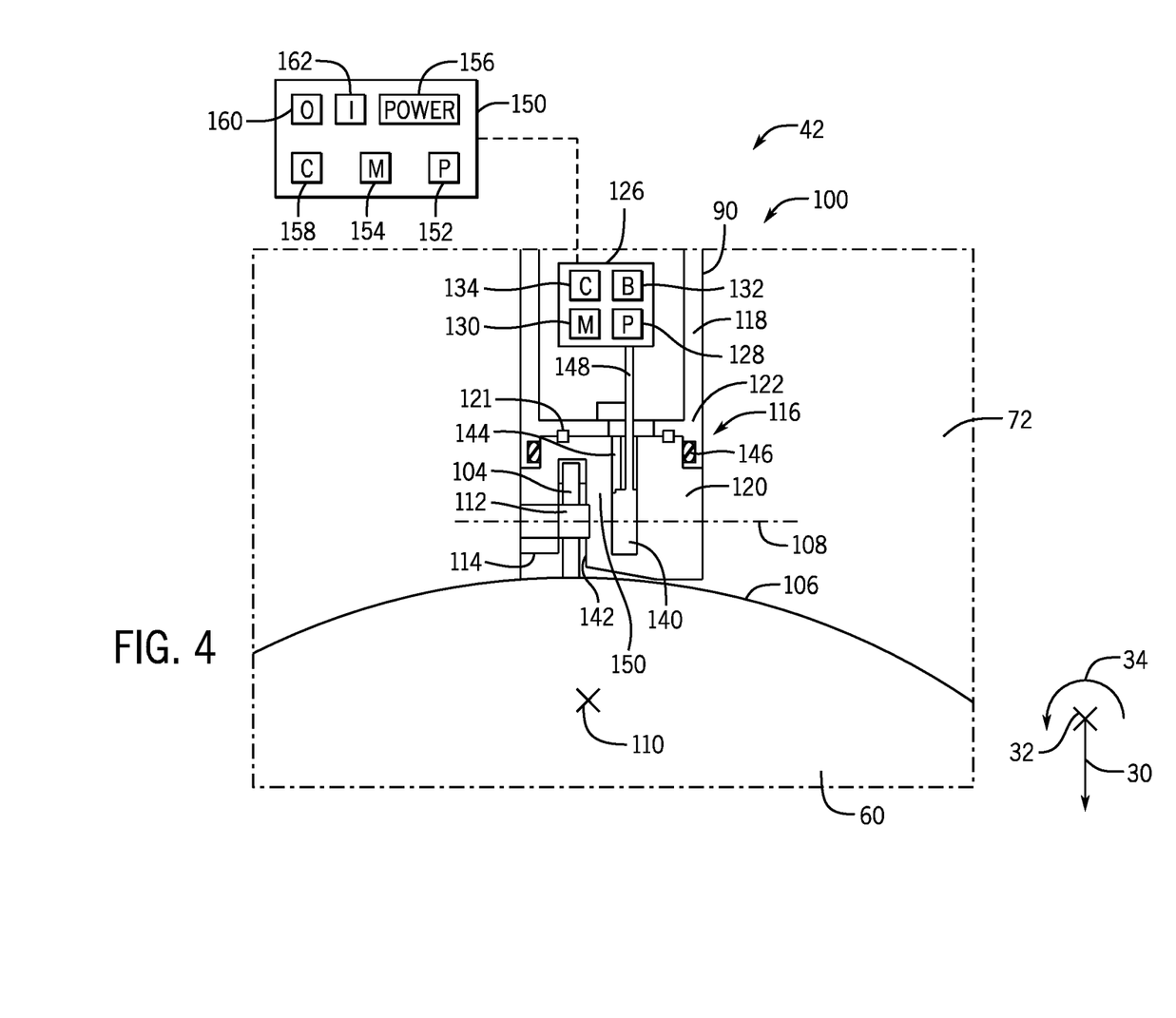
FIG. 4 is a cross-sectional front view of an embodiment of a sensor assembly that may be used in the monitoring system of FIG. 1, wherein an encoder is positioned along an axis of rotation of a rotatable wheel of the sensor assembly.

Various features of the sensor assembly 100 are shown in FIG. 4, which illustrates a cross-sectional front view of an embodiment of the sensor assembly 100. In some embodiments, the rotatable wheel 104 may be coupled to or include a magnet, such that rotation of the rotatable wheel 104 causes a shift in a magnetic field that is detectable by an encoder 140 (e.g., hall-effect encoder). In the illustrated embodiment, the rotatable wheel 104 is coupled (e.g., non-rotatably coupled, such as via a press or friction fit) to an axle 112 (e.g., magnetic actuator), which may be coaxial with and/or extend through a center of the rotatable wheel 104 and may be supported (e.g., rotatably supported) within an opening 114 (e.g., cylindrical and/or radially-extending recess) formed in a housing 116 of the sensor assembly 100. In some embodiments, the axle 112 is supported within the opening 114 without the use of bearings or bushings. In some embodiments, the axle 112 is a magnetic actuator and includes the magnet that is detectable by the encoder 140.

In the illustrated embodiment, the housing 116 includes a shaft portion 118 (e.g., annular shaft or pipe) and a cap portion 120 (e.g., end cap). As shown, the shaft portion 118 may be an elongated annular pipe that extends along the channel 90 formed in the bonnet 72, and the cap portion 120 may be coupled (e.g., via welding, bonding, press-fit interface, interference-fit interface, and/or one or more fasteners 121, such as threaded fasteners, snap-fit couplings, key-slot couplings, or the like) to a radially-inner end 122 of the shaft portion 118. While the shaft portion 118 and the cap portion 120 are illustrated as physically separate components, it should be understood that the housing 116 may be formed from any number (e.g., 2, 3, 4, 5, or more) of portions that are joined together, or may be a one-piece structure, such as a one-piece structure molded to have the disclosed features and geometry, for example.

In some embodiments, the shaft portion 118 may support various components of a controller assembly 126 (e.g., electronic controller assembly), such as a processor 128, a memory device 130, a battery 132, and/or a communications port 134, for example. In some embodiments, the cap portion 120 may support the rotatable wheel 104, the axle 112, and/or the encoder 140. In the illustrated embodiment, the cap portion 120 includes a first recess 142 (e.g., radially-inward facing recess open toward the connecting rod 60) that supports the rotatable wheel 104 and enables the rotatable wheel 104 to extend radially-inward from the cap portion 120 to contact the connecting rod 60. As shown, the cap portion 120 includes a second recess 144 (e.g., radially-outward facing recess open toward the shaft portion 118) that supports the encoder 140 and enables the encoder 140 to electrically connect to other components via a cable 148 (e.g., electrical cable), such as the various components of the controller assembly 126. One or more seals 146 (e.g., annular seals) may be provided between the shaft portion 118 and the cap portion 120. Thus, the encoder 140 and the various components of the controller assembly 126 may be sealed within the shaft portion 118 and/or the second recess 144 and may be protected from fluids and/or high pressure in the subsea environment, for example.

In the illustrated embodiment, the encoder 140 is physically separated from (e.g., does not directly contact) the rotatable wheel 104 and the axle 112 by a portion 150 (e.g., radially-extending intermediate portion) of the cap portion 120. However, other configurations are envisioned. For example, in some embodiments, the opening 114 and/or the axle 112 may connect with and/or extend into the second recess 144 that supports the encoder 140. In some such embodiments, one or more seals (e.g., annular seals) may be provided circumferentially about the axle 112 to seal and to block fluid flow into the second recess 144 from the first recess 142 and/or the subsea environment.

In operation, as the actuator 56 moves in the direction of travel 110 to drive the ram 50 between the open position 52 and the closed position 54, friction between the connecting rod 60 of the actuator 56 and the rotatable wheel 54 cause the rotatable wheel 104 and the axle 112 to rotate together about the axis of rotation 108. As the rotatable wheel 104 and the axle 112 rotate about the axis of rotation 108, the encoder 140 (e.g., hall-effect sensors within the encoder 140) detects the rotating magnetic field (e.g., due to the arrangement of the magnetic poles in the axle 112 relative to the encoder 140), and the encoder 140 may generate signals (e.g., pulses) based on the detected rotating magnetic field. Thus, the signals generated by the encoder 140 are indicative of rotation of the rotatable wheel 104 (e.g., a number of rotations of the rotatable wheel 104) and may be processed, such as by the processor 128 of the controller assembly 126, to determine the linear movement (e.g., in the direction of travel 110 and/or along the axial axis 32) of the connecting rod 60, and thus, the ram 50. As shown, the encoder 140 is aligned with the rotatable wheel 104, the axle 112, and the axis of rotation 108 along the radial axis 30 of the BOP 40 (e.g., the axis of rotation 108 extends through the encoder 140). In certain embodiments, the encoder 140 may be an incremental encoder that is configured to generate approximately 16, 32, 64, 128, 256, 512, 1024, or 4096 pulses per revolution of the axle 112 and the attached rotatable wheel 104.

The components of the sensor assembly 100 may be formed of any suitable material. For example, in some embodiments, the rotatable wheel 104 may be formed from rubber, elastomer, polymer, or any other material that is able to withstand subsea fluids and pressures and that enables the rotatable wheel 104 to couple to the axle 112 (e.g., via a friction fit) and/or that enables linear movement of the connecting rod 60 to drive rotation of the rotatable wheel 104 (e.g., provides sufficient coefficient of friction). In some embodiments, the axle 112 may include magnetic material (e.g., metal alloy magnetic material, ferromagnetic material, magnetized material, rare earth magnet, permanent magnet, such as samarium-cobalt [SmCo]) and encapsulated within a metal alloy housing (e.g., nickel and copper [Ni-CU-Ni]) that is able to withstand subsea fluids and pressures. In some embodiments, the encoder 140 may house its components (e.g., the hall-effect sensors and electrical circuitry) within a metal or metal alloy material (e.g., aluminum). In some embodiments, the encoder shaft 118 and/or the cap 120 may be a polymer, metal, or metal alloy material and/or may be a non-ferrous material. Regardless of the composition of the other portions of the housing 116, the portion 150 positioned between the axle 112 and the encoder 150 may be a non-ferrous material, such as stainless steel, to enable detection of the changes in the magnetic field (e.g., of the axle 112) by the encoder 140. The materials provided herein are merely provided as examples and are not intended to be limiting.

As shown in FIG. 4, in some embodiments, the controller assembly 126 may include the processor 128, the memory device 130, the battery 132, and/or the communications port 134, and the controller assembly 126 may be communicatively coupled to a control system 150 (e.g., remote control system located external to the sensor assembly 100 and/or the BOP 40, such as at the platform 12 at the sea surface 14). As shown, the control system 150 may include a processor 152, a memory device 154, a power source 156, a communications port 158, an output device 160 (e.g., a display, a speaker, or a light), and/or an input device 162 (e.g., a switch, button, or the like), for example. In certain embodiments, the power source 156 may supply power (e.g., direct current [DC] power supply) to components of the controller assembly 126 and/or may charge the battery 132 to enable the battery 132 to provide power to components of the controller assembly 126 and/or the sensor assembly 100 upon loss of the power supply from the power source 156, for example. Such a configuration may enable the monitoring system 42 to monitor the position of the actuator 56 and/or the ram 50 of the BOP 40 after loss of the power supply from the power source 156 and/or to monitor changes in the position of the actuator 56 and/or the ram 50 after loss of the power supply from the power source 156 (e.g., changes in position due to actuation of the actuator 56 by a remotely operated vehicle [ROV], autonomously operated vehicle [AOV], or the like).

In some embodiments, the controller assembly 126 may communicate with the control system 150. For example, the controller assembly 126 may communicate with the control system 150 via a Controller Area Network (CAN). In some embodiments, the controller assembly 126 may be configured to read instructions or requests (e.g., Service Data Objects [SDO] requests) and/or transfer data (e.g., via Transmit Process Data Object [TPDO] protocols), such as the data related to the position of the actuator 56 and/or the ram 50, to the control system 150. In some embodiments, the control system 150 may be configured to write operating parameters and commands (e.g., via SDO object protocols) and/or may receive data (e.g., via TPDO transmissions), such as the data related to the position of the actuator 56 and/or the ram 50, for example.

In some embodiments, the controller assembly 126 and/or the control system 150 may carry out a calibration process to calibrate the encoder 140. For example, prior to subsea deployment (e.g., at manufacturing and/or at the sea surface 14), upon installation at the sea floor 20, and/or periodically after installation at the sea floor 20, the encoder 140 may be calibrated. In some embodiments, the control system 150 may provide a control signal to adjust the actuator 56 to a first limit position (e.g., the open position 52 or the closed position 54). At the first limit position, the controller assembly 126 may set or associate the first limit position with a zero value or a baseline value. In some embodiments, the control system 150 may adjust the actuator 56 to move the actuator 56 to a second limit position (e.g., the open position 52 or the closed position 54) different from the first limit position, and the controller assembly 126 may set or associate the second limit position with another value (e.g., a maximum value). In some embodiments, the control system 150 and/or the controller assembly 126 may determine a number of rotations of the rotatable wheel 104 as the actuator 56 travels between the first and the second limit positions, which may be utilized to determine the position of the actuator 56 and/or provide an output indicative of the position of the actuator 56 during monitoring operations, for example. In some embodiments, the encoder 140 may be recalibrated by carrying out some or all of the calibration steps outlined above (e.g., moving the actuator 56 between the limit positions, associating the limit positions with values, and/or calculating the number of rotations). In some embodiments, the encoder 140 may be recalibrated by adjusting the actuator 52 to the first limit position 52 and re-setting the encoder 140 to the zero value or the baseline value.

In some embodiments, the control system 150 may be configured to determine other parameters, such as a speed of travel of the actuator 56, based on the signals generated by the encoder 140 and/or the data received from the controller assembly 126. In some embodiments, the control system 150 may be configured to identify a potential error in the operation of the sensor assembly 100 and/or the BOP 40. For example, if the control system 150 receives data that indicates that the rotatable wheel 104 does not rotate when expected (e.g., after fluid is provided to drive the actuator 56), the control system 150 may determine that there is a potential error in operation of the sensor assembly 100 and/or the BOP 40.

In some embodiments, the control system 150 may instruct the output device 160 to provide an output (e.g., a visual or audible output or a control signal) indicative of the position of the actuator 56 and/or the ram 50. For example, the control system 150 may be configured to instruct the output device 160 to provide a visual display of a numerical indication of the position of the actuator 56 and/or the ram 50 (e.g., a distance from the open position 52 and/or from the closed position 54, a number of rotations of the rotatable wheel 104 from the open position 52 and/or the closed position 54, and/or a percent from the open position 52 and/or from the closed position 54), a graphical or image representation (e.g., simulation) of the position of the actuator 56 and/or the ram 50. In some embodiments, the control system 150 may be configured to instruct the output device 160 to provide a visual display indicative of other determined parameters, such as a speed of travel of the actuator 56. In some embodiments, the control system 150 may be configured to provide an indication (e.g., a visual display, an audible alarm, and/or a lighted indicator) when the sensor assembly 100 detects movement of the actuator 56, the actuator 56 reaches the open position 52, and/or the actuator 56 reaches the closed position 54. In some embodiments, the control system 150 may be configured to provide an indication of a potential error in the operation of the sensor assembly 100 and/or the BOP 40. For example, if the control system 150 receives data that indicates that the rotatable wheel 104 does not rotate when expected (e.g., after fluid is provided to drive the actuator 56), the control system 150 may instruct the output device 160 to provide an indication (e.g., a visual display, an audible alarm, and/or a lighted indicator) of the potential error in operation of the sensor assembly 100 and/or the BOP 40. In some embodiments, the control system 150 may be configured to provide an indication (e.g., a displayed textual instruction, an audible message, and/or a lighted indicator) to calibrate and/or to re-calibrate the sensor assembly 100, such as when the actuator 56 is adjusted to a limit position (e.g., the open position 52 or the closed position 54) and the position data obtained from the sensor assembly 100 does not align with the limit position (e.g., is not zero or a baseline reading).

As noted above, in some embodiments, the control system 150 may be configured to output control signals to various components of the monitoring system 42 and/or the BOP 40. For example, in certain embodiments, the control system 150 may be configured to control the actuator 56 to adjust a position of the respective ram 50 automatically based on well conditions (e.g., well pressure), a current determined position of the actuator 56 (e.g., as indicated by the signal generated by the encoder 140), and/or an operator input received via the user input 162. In some embodiments, the control system 150 may be configured to provide the output periodically at predetermined intervals (e.g., 0.5, 1, 3, 5, 10, 15, 30, 60, 90, or more minutes) and/or periodically based on a determined position and/or movement (e.g., distance or linear movement) of the actuator 56 (e.g., upon reaching the open position 52, upon reaching the closed position 54, and/or at predetermined length(s) like at 0.25, 0.5, 0.75, 1, 1.5, 2, 3, 4, 5, or more centimeters [cm]).

In the illustrated embodiment, the processors 128, 152 may be used to execute software, such as software for controlling the various components of the monitoring system 42. Moreover, the processors 128, 152 may include multiple microprocessors, one or more "general-purpose" microprocessors, one or more special-purpose microprocessors, and/or one or more Application Specific Integrated CircuitS (ASICS), or some combination thereof. For example, the processors 128, 152 may include one or more Reduced Instruction Set Computing (RISC) or Complex Instruction Set Computing (CISC) processors. The memory devices 130, 154 may include a volatile memory, such as Random Access Memory (RAM), and/or a nonvolatile memory, such as Read Only Memory (ROM). The memory devices 130, 154 may store a variety of information and may be used for various purposes. For example, the memory devices 130, 154 may store processor-executable instructions (e.g., firmware or software) for the processors 128, 152 to execute, such as instructions for processing the signals generated by the encoder 140. The storage device(s) (e.g., nonvolatile storage) may include ROM, flash memory, a hard drive, or any other suitable optical, magnetic, or solid-state storage medium, or a combination thereof. The storage device(s) may store data (e.g., position data), instructions (e.g., software or firmware for processing signals), and any other suitable data.

It should be understood that, in certain embodiments, the monitoring system 42 may include a distributed control system with one or more controllers (e.g., electronic controllers with processors, memory, and instructions, such as the controller assembly 126 and the control system 150) distributed about the drilling and production system and in communication with one another to receive and/or to process the signals from one or more encoder 140, to provide an output, and/or to control the components of the monitoring system 42 and/or the BOP 40. Thus, to the extent that certain processing functions are described as carried out by the controller assembly 126 and/or the control system 150 to facilitate discussion, it should be understood that such processing functions may be carried out by either the controller assembly 126, the control system 150, or any of a variety of different controllers at various locations.

Figure 5:
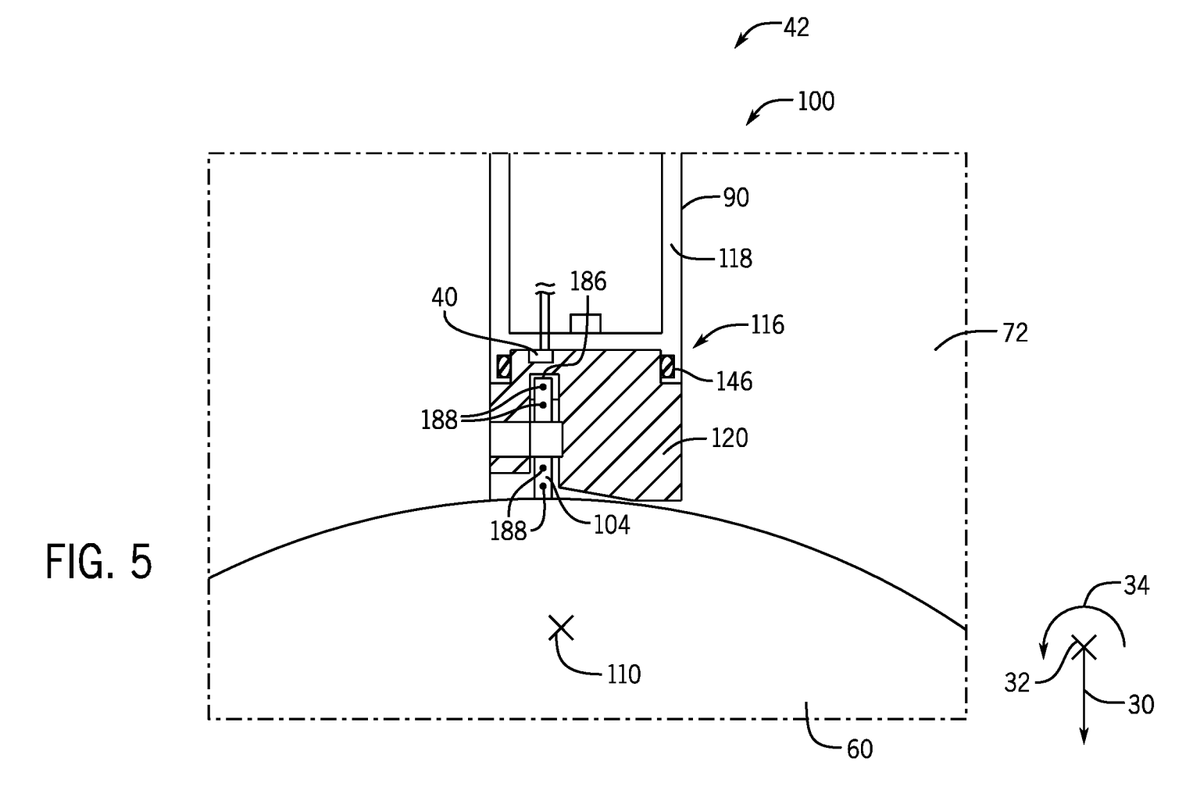
FIG. 5 is a cross-sectional front view of an embodiment of a sensor assembly that may be used in the monitoring system of FIG. 1, wherein an encoder is positioned proximate to a radially-outer side of a rotatable wheel of the sensor assembly.

It should be understood that the encoder 140 may have any of a variety of configurations that enable detection of rotation of the rotatable wheel 104. For example, FIG. 5 is a cross-sectional front view of an embodiment of the sensor assembly 100 that may be used in the monitoring system of FIG. 1 in which the encoder 140 is positioned proximate to a radially-outer surface 186 (e.g., annular surface or side wall) of the rotatable wheel 104 of the sensor assembly 100. In the illustrated embodiment, the rotatable wheel 104 may include flags 188 (e.g., magnetic or steel flags) spaced circumferentially about the radially-outer surface 186 of the rotatable wheel 104. As the rotatable wheel 104 rotates, the encoder 140 acts a proximity switch to count or to register each flag 188, thereby detecting rotation of the rotatable wheel 104. As discussed above, the encoder 140 may generate a signal indicative of the rotation of the rotatable wheel 104, which is then processed by one or more processors (e.g., the processors 128, 152) to determine the position of the connecting rod 60, and thus, the attached ram 50.

It should be understood that the sensor assembly 100 may include any suitable type of sensor, such as an optical sensor, an acoustic sensor, a mechanical sensor, or the like, that is configured to monitor rotation of the rotatable wheel 104. For example, the flags 188 may include optical elements (e.g., reflectors or encoder bars) that are configured to reflect light, and the encoder 140 may include an emitter configured to emit light toward the flags 188 of the rotatable wheel 104 and an optical detector configured to receive the light reflected by the flags 188 of the rotatable wheel 104, thereby enabling the encoder 140 to detect rotation of the rotatable wheel 140 and to generate a signal indicative of rotation of the rotatable wheel 104. For example, the flags 188 may be recesses detectable by a spring-loaded switch or button that moves in and out of the recesses as the rotatable wheel 104 rotates and communicates with the encoder 140, thereby enabling the encoder 140 to detect rotation of the rotatable wheel 140 and to generate a signal indicative of rotation of the rotatable wheel 104

Figure 6:
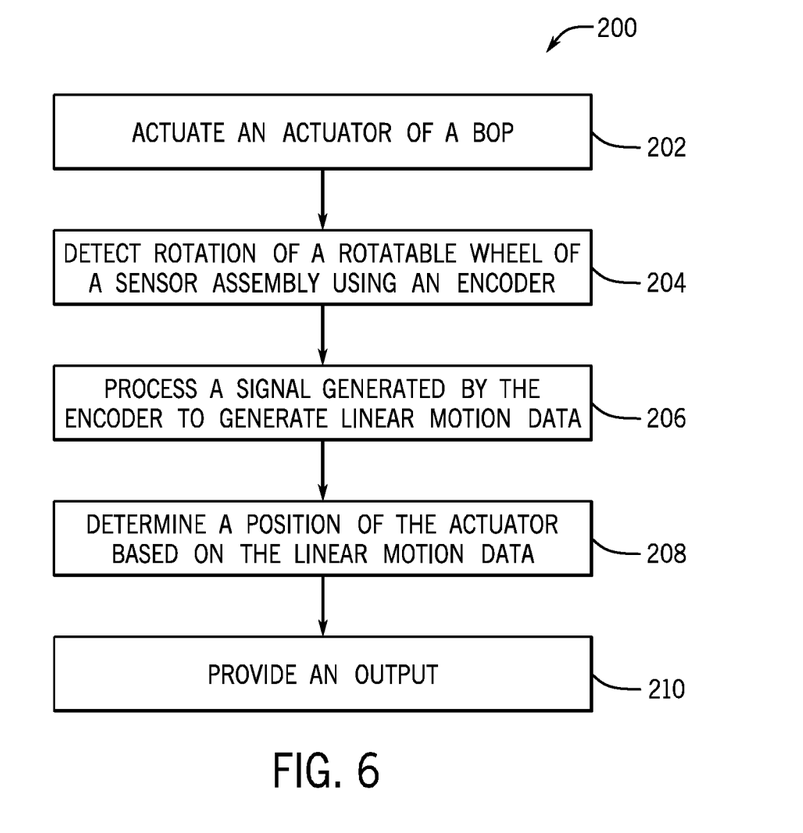
FIG. 6 is a flow diagram of a method of using the monitoring system of FIG. 1, in accordance with an embodiment of the present disclosure.

FIG. 6 is a flow diagram of an embodiment of a method 200 of operating the monitoring system 42. The method 200 includes various steps represented by blocks. It should be noted that the method 200 may be performed as an automated procedure by a system, such as the monitoring system 42. Although the flow chart illustrates the steps in a certain sequence, it should be understood that the steps may be performed in any suitable order and certain steps may be carried out simultaneously, where appropriate. Further, certain steps or portions of the method 200 may be omitted and other steps may be added. The steps or portions of the method 200 may be performed by separate devices. For example, a first portion of the method 200 may be performed by the controller assembly 126, while a second portion of the method 200 may be performed by the control system 150. The method 200 may be carried out periodically (e.g., based on instructions stored in a memory device, such as the memory device 130, 154), in response to operator input (e.g., via an input device 162), or the like. To facilitate discussion, the method 200 relates to use of the sensor assembly 100 within the bonnet 72 to directly measure linear movement of the connecting rod 60 of the BOP 40. However, it should be understood that the method 200 may be adapted to monitor a position of any of a variety of components within mineral extraction systems.

The method 200 may begin by actuating the actuator 56 coupled to the ram 50 of the BOP, in step 202. As discussed above, the linear movement of the actuator 56 may drive the rotatable wheel 104 to rotate about its axis of rotation 108. In step 204, the encoder 140 may detect rotation of the rotatable wheel 104, such as via detection of a shift in a magnetic field (e.g., of a magnet coupled to the rotatable wheel 104, such as within the axle 112) induced by the rotation of the rotatable wheel 104, and the encoder 140 may generate a signal (e.g., a stream of incremental pulses) based on the detected shift in the magnetic field. In step 206, the signal generated by the encoder 140 may be processed, such as by the processor 128 of the controller assembly 126 supported within the shaft portion 118 of the housing 116 of the sensor assembly 100, into linear motion data (e.g., indicative of the linear motion of the actuator 56). In step 208, the data may be processed, such as by the processor 152 of the control system 150, to determine the position of the actuator 56, and thus, the attached ram 50. In step 210, a processor, such as the processor 152 of the control system 150, may provide an output, such as a visual or audible output via the output device 160 and/or a control signal to control operation of a component of the BOP 40, for example. The monitoring system 42 may be configured to provide any suitable output, including those discussed above.

The embodiments discussed above are provided as examples to facilitate discussion. In certain embodiments, the disclosed monitoring system 42 may include some or all of the following features. For example, as shown in FIGS. 2 and 3, the actuator 56 comprises an open side 180 and a closed side 182. When fluid is provided on the open side 180 of the actuator 56, the fluid drives the actuator 56 into the open position 52. When fluid is provided on the closed side 182 of the actuator 56, the fluid drives the actuator 56 into the closed position 54. In certain embodiments, the sensor assembly 100 may be positioned on the open side 180 of the actuator 56, such as in the bonnet 72 of the BOP 40. Such a configuration may enable monitoring the position of the actuator 56 and/or the ram 50 without creating a leak path on the closed side 182 of the actuator 56. Placement of a channel (e.g., the channel 90 on the closed side 182 of the actuator 56 creates a potential leak path on the closed side 182 of the actuator 56 and increases the possibility that the fluid may escape from a chamber 74 and reduce the force 64 on the actuator 56, thereby causing the ram 50 to move from the closed position 54 toward the open position 52. The disclosed configuration enables the components of the sensor assembly 100 to be positioned on the open side 180 of the actuator 56, and during a kick event or other time when the ram 50 should be in the closed position 54, the rams 50 may remain in the closed position 54 and any fluid that leaks through the channel 90 or other portion of the monitoring system 42 would not cause the rams 50 to move from the closed position 54 toward the open position 52.

Additionally or alternatively, in some embodiments, the sensor assembly 100 may be positioned at a location that is configured to support a weep hole (e.g., drain) and/or the sensor assembly 100 may be positioned within and/or retrofitted into an existing weep hole extending through the bonnet 72 of the housing 70. In some such embodiments, the weep hole may be relocated to another location of the bonnet 72. In some embodiments, the sensor assembly 100 may be inserted into the housing by pushing (e.g., exerting a radially-inward force) on the housing 116 and/or removed by pulling (e.g., exerting a radially-outward force) on the housing 116, thereby facilitating efficient inspection, replacement, repair, and/or maintenance, for example.

As noted above, the body 70 may include the bonnet 72 and any of a variety of other components, such as the bolted flange 84, a cylinder 184 that supports the piston 58, a bore housing that defines the bore 25, and/or other physically separate components that are coupled (e.g., via fasteners, such as threaded fasteners) to one another, and it should be understood that the channel 90 that supports the sensor assembly 100 may be formed in any one of these components of the BOP 40. Furthermore, while certain embodiments described herein include the sensor assembly 100 positioned within the bonnet 72, such that the rotatable wheel 104 contacts the connecting rod 60, it should be understood that the sensor assembly 100 may be adapted for use within any of a variety of components of the BOP 40, such that the rotatable wheel 104 contacts another movable component, such as the piston 58 or the ram 50 of the BOP 40, for example. For example, in addition to or as an alternative to one or more sensor assemblies 100 within the bonnet 72 to enable the rotatable wheel 40 to contact the connecting rod 60, the BOP 40 may include one or more sensor assemblies 100 within the bolted flange 84 and/or the cylinder 184 to enable the rotatable wheel 104 to contact the piston 58.

Furthermore, the sensor assembly 100 having the rotatable wheel 104 may be utilized to monitor motion (e.g., linear or rotational motion) of any other movable component of mineral extraction systems, such as actuators within accumulators of the BOP 40, actuators associated with other flow control devices (e.g., annular BOPs, valves, gate valves, choke valves, ball valves, etc.), dynamic tubular structures (e.g., telescoping joints), or the like. While one sensor assembly 100 is illustrated within the bonnet 72 of the BOP 40, it should be understood that multiple sensor assemblies 100 may be provided about the BOP 40, such as along each actuator 56 and/or other movable components of the BOP 40 and/or other movable components of the mineral extraction system (e.g., to provide redundancy and/or to monitor multiple movable components).

While the illustrated embodiments depict the sensor assembly 100 positioned such that the rotatable wheel 104 is coupled to a stationary component (e.g., the bonnet 72) and the radially-outer surface 186 of the rotatable wheel 104 contacts the movable component (e.g., the actuator 56 of the BOP 40), it should be understood that in some embodiments, the rotatable wheel 104 may be coupled to and extend from (e.g., radially-outward from) the movable component such that the radially-outer surface 186 contacts the stationary body (e.g., the bonnet). In some such embodiments, the rotatable wheel 104 may move (e.g. axially) with the movable component and roll (e.g., rotate) along the stationary body, thereby enabling the encoder 140 to detect rotation of the rotatable wheel 104 and to generate a signal that enables determination of the position of the movable component in the manner set forth above. In some such embodiments, the encoder 140 may be coupled to the movable component 140, such as within the housing 116 that is supported within a passageway formed in the movable component, and the encoder 140 may transmit data (e.g., pulses) via a wired or wireless connection to the controller assembly 126 for further processing, for example. While certain embodiments disclosed herein relate to offshore (e.g., subsea) mineral extraction systems, it should be understood that the systems and methods may be adapted to monitor components of jack-up rigs (e.g., having a BOP positioned above a sea surface) and/or on-shore (e.g., land-based rigs having a BOP positioned under a rig floor) mineral extraction systems.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A monitoring system for a blowout preventer (BOP) of a mineral extraction system, comprising:
a sensor assembly, comprising:
  a housing;
  a rotatable wheel supported within the housing, wherein the rotatable wheel extends through an opening of the housing, such that the rotatable wheel is configured to contact a surface of a movable component of the BOP to enable linear movement of the movable component of the BOP to drive rotation of the rotatable wheel; and
  an encoder configured to detect rotation of the rotatable wheel and to generate a signal indicative of the rotation of the rotatable wheel to enable determination of a position of the movable component of the BOP.

2. The system of claim 1, wherein the rotatable wheel is supported by an axle comprising a magnet that is detectable by the encoder.

3. The system of claim 1, wherein the encoder comprises one or more hall-effect sensors configured to detect a shift in a magnetic field induced by rotation of the rotatable wheel.

4. The system of claim 1, wherein a radially-outer surface of the rotatable wheel is configured to contact the surface of the movable component of the BOP.

5. The system of claim 1, wherein the rotatable wheel comprises a rubber material.

6. The system of claim 1, wherein the housing comprises an elongated shaft portion and a cap portion coupled at a radially-inner end of the shaft portion, and the cap portion supports the rotatable wheel and the encoder.

7. The system of claim 6, wherein the cap portion comprises a radially-inward facing recess that supports the rotatable wheel and enables the rotatable wheel to extend through the opening of the housing and a radially-outward facing recess open toward the elongated shaft portion that supports the encoder and enables the encoder to electrically connect to components of a controller assembly positioned within the elongated shaft portion via a cable.

8. The system of claim 1, comprising one or more processors and an output device, wherein the one or more processors are configured to determine the position of the movable component of the BOP and to instruct the output device to provide an indication of the position of the movable component of the BOP.

9. The system of claim 1, comprising a battery positioned within the housing and configured to provide a power supply to the encoder.

10. A blowout preventer (BOP) system for a mineral extraction system, comprising:
a movable component;
a body supporting the movable component; and
a sensor assembly comprising a housing, a rotatable wheel, and an encoder, wherein the rotatable wheel extends through an opening of the housing, such that the rotatable wheel is configured to contact a surface of the movable component to enable linear movement of the movable component to drive rotation of the rotatable wheel, and the encoder is configured to detect rotation of the rotatable wheel to enable determination of a position of the movable component.

11. The system of claim 10, wherein the sensor assembly comprises a magnetic actuator that is non-rotatably coupled to the rotatable wheel, and the encoder is configured to detect a shift in a magnetic field of the magnetic actuator induced by rotation of the rotatable wheel.

12. The system of claim 11, wherein the magnetic actuator comprises an axle that extends through a center of the rotatable wheel.

13. The system of claim 10, wherein the sensor assembly is coupled to the body and is positioned on an open side of an actuator that is configured to drive a ram of the BOP.

14. The system of claim 10, wherein the body comprises a bonnet that circumferentially surrounds a connector arm extending between a piston and a ram of the BOP.

15. The system of claim 10, wherein the movable component comprises a connector arm extending between a piston and a ram of the BOP.

16. The system of claim 10, comprising one or more processors and an output device, wherein the one or more processors are configured to determine the position of the movable component of the BOP based on a signal generated by the encoder and to instruct the output device to provide an indication of the position of the movable component of the BOP.

17. The system of claim 10, comprising a control system configured to calibrate the encoder.

18. A method for monitoring a blowout preventer (BOP) of a mineral extraction system, the method comprising:
    detecting, using an encoder, rotation of a rotatable wheel, wherein the rotatable wheel extends through an opening of a housing, such that the rotatable wheel is configured to contact a surface of a movable component of the BOP to enable rotation of the rotatable wheel to be caused by linear movement of the movable component of the BOP;
    processing, using one or more processors, a signal generated by the encoder based on the detected rotation of the rotatable wheel to determine a position of the movable component of the BOP; and
    instructing, using the one or more processors, a display to provide a displayed output indicative of the position of the movable component.

19. The method of claim 18, wherein detecting rotation of the rotatable wheel using the encoder comprises detecting a shift in a magnetic field of a magnetic actuator that is coupled to the rotatable wheel as the rotatable wheel rotates.

20. The method of claim 18, comprising calibrating the encoder using the one or more processors.

* * * * *